United States Patent [19]
Tsubai

[11] Patent Number: 4,944,557
[45] Date of Patent: Jul. 31, 1990

[54] SEAT BELT HANDLE ASSEMBLY

[76] Inventor: Ryozo Tsubai, 3637 W. Alabama, #155, Houston, Tex. 77027

[21] Appl. No.: 199,806

[22] Filed: May 27, 1988

[51] Int. Cl.⁵ ............................................. B60R 21/00
[52] U.S. Cl. ..................................... 297/468; 297/483
[58] Field of Search ......................... 297/483, 468, 482

[56] References Cited

U.S. PATENT DOCUMENTS

| | | | |
|---|---|---|---|
| 3,291,528 | 12/1966 | Sencabaugh | 297/468 |
| 3,471,197 | 10/1969 | Ely | 297/483 |
| 4,033,594 | 7/1977 | Lindblad | 297/483 |
| 4,057,181 | 11/1977 | Finnigan | 297/483 |
| 4,146,268 | 3/1979 | Bost | 297/483 |
| 4,312,539 | 6/1982 | Takada | 297/468 |
| 4,557,523 | 12/1985 | Motonami | 297/468 |
| 4,600,217 | 7/1986 | Naumann | 297/483 |
| 4,667,982 | 5/1987 | Volk | 297/483 |
| 4,684,153 | 8/1987 | Miller | 297/483 |
| 4,685,740 | 8/1987 | Fohl | 297/468 |

FOREIGN PATENT DOCUMENTS 1598398  9/1981  United Kingdom ............... 297/468

Primary Examiner—Francis K. Zugel
Attorney, Agent, or Firm—Kenneth A. Keeling

[57] ABSTRACT

The present invention provides a seat belt handle assembly which allows a vehicle passenger to conveniently grasp a seat and shoulder belt from its retracted position for engagement. The apparatus comprises a clip assembly slidably attached to the shoulder belt with a handle projecting from the clip assembly. The clip assembly and handle are positioned such that the handle extends forward from the seat and shoulder belt to a location beside and slightly in front of the occupant's torso when the seat and shoulder belt is in the retracted position, thereby allowing the occupant to grasp the handle of the seat belt handle assembly and pull the seat and shoulder belt forward parallel to the direction of the occupant without the necessity of reaching behind the plane of the occupant's torso.

3 Claims, 1 Drawing Sheet

U.S. Patent
Jul. 31, 1990
4,944,557
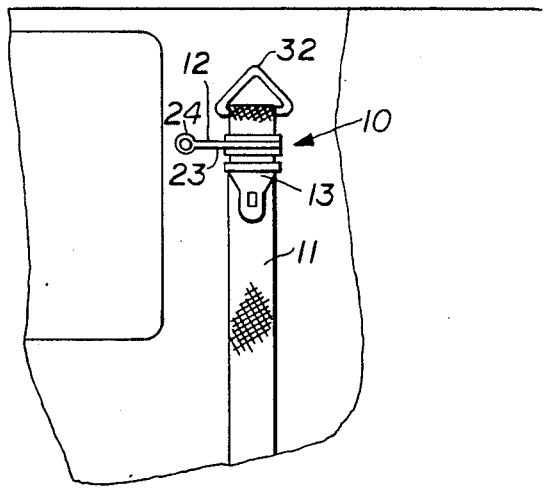
FIG. 1
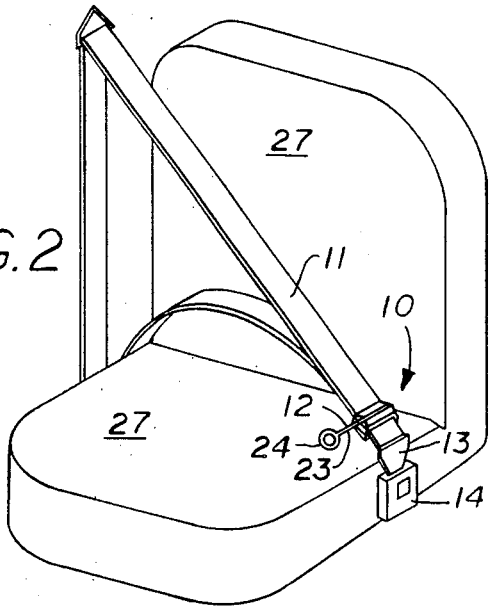
FIG. 2
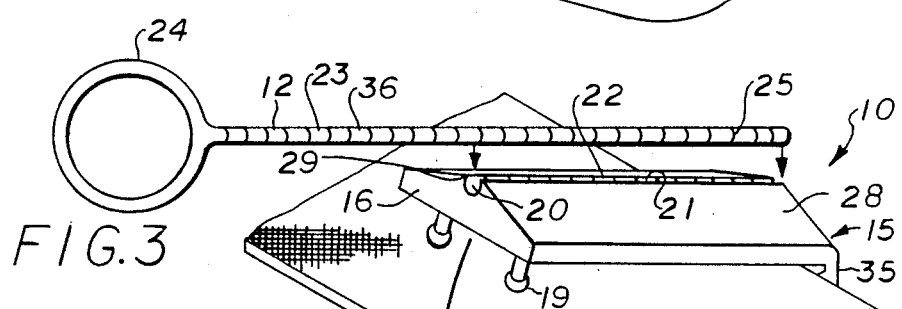
FIG. 3
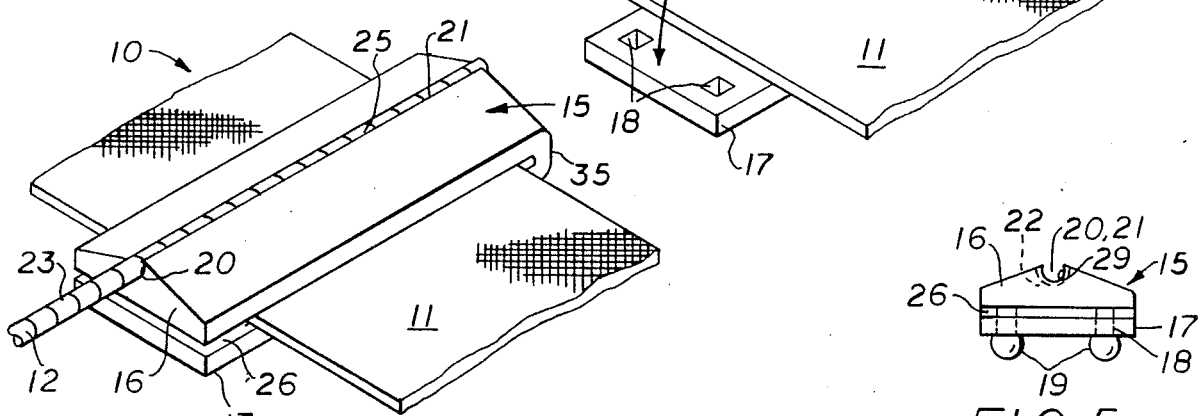
FIG. 4
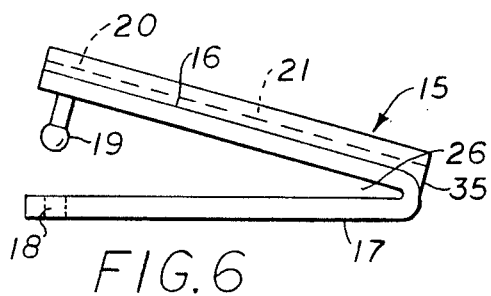
FIG. 5
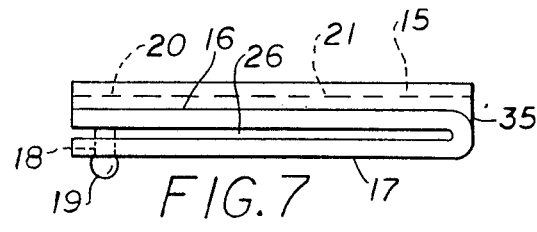
FIG. 6
FIG. 7

SEAT BELT HANDLE ASSEMBLY

BACKGROUND OF THE INVENTION

The present invention relates to seat belts for vehicles, More particular, the invention is directed to an apparatus for grasping a seat and shoulder belt when the seat and shoulder belt is in its retracted position without the necessity of reaching behind the plane of the occupant's torso.

Conventional seat belts and shoulder belts for the front seats of automotive vehicles includes a seat and shoulder belt which, when engaged, provides restrictive constraint along the passenger's waist and upper torso. When retracted the seat and shoulder belt typically hangs in an approximately vertical line from the upper attachment point of the belt to the automobile. Attachment points are typically located just behind the door opening of the vehicle to allow a passenger to enter and exit the vehicle without interference from the seat and shoulder belt. Once seated, the passenger is compelled to reach across the passenger's torso and slightly behind the plane of the passenger's torso to grasp the seat and shoulder belt. The location of the retracted seat belt is therefore inconvenient for passengers and extremely difficult for those passengers with restricted movement capabilities. It is therefore an object of this invention to provide a seat belt handle assembly which may be attached to a seat belt with the handle projecting forward which provides for convenient access by the passenger to the seat and shoulder belt.

It is a further object of this invention to provide a seat belt handle assembly which passively reminds the occupant of the vehicle to engage the occupant's seat belt.

SUMMARY OF THE INVENTION

The present invention provides a seat belt handle assembly which allows an automobile passenger to conveniently grasp a seat and shoulder belt from its retracted position for engagement. The apparatus comprises a clip assembly slidably attached to the shoulder belt having a handle projecting from the clip assembly. The clip assembly and handle, are positioned such that the handle extends from the seat and shoulder belt forward to a location beside and slightly in front of the occupant's torso when the seat and shoulder belt is in the retracted position, allowing the occupant to grasp the handle of the seat belt handle assembly and pull the seat belt forward parallel to the direction of the occupant without the necessity of reaching behind the plane of the occupant's torso.

BRIEF DESCRIPTION OF THE DRAWINGS

FIG. 1 is a schematic view of the seat belt handle assembly according to the invention shown attached to a retracted seat and shoulder belt.

FIG. 2 is a schematic view of the seat belt handle assembly according to the invention shown attached to an engaged seat and shoulder belt.

FIG. 3 depicts in detail the seat belt handle assembly prior to attachment to the seat and shoulder belt.

FIG. 4 depicts the seat belt handle assembly attached to the seat and shoulder belt.

FIG. 5 depicts a front elevation of the clip assembly portion of the seat belt handle assembly.

FIG. 6 depicts a side view of the clip assembly portion of the seat belt handle assembly in an open position.

FIG. 7 depicts a side view of the clip assembly portion of the seat belt handle assembly in the engaged position.

DETAILED DESCRIPTION OF THE INVENTION

The present invention provides a seat belt handle assembly which allows an automobile passenger to more conveniently reach a seat and shoulder belt from its retracted position. The invention comprises a clip assembly slidably attached to the shoulder belt, the clip assembly having a handle projecting therefrom. The clip assembly and handle are positioned such that the handle extends from the seat and shoulder belt forward to a location beside and slightly to the front of the occupant's torso when the seat and shoulder belt is in the retracted position, allowing the occupant to grasp the handle of the seat belt handle assembly and pull the seat belt forward parallel to the direction of the occupant without the necessity of reaching behind the plane of the occupant's body.

A detailed description of the present invention in its preferred embodiment is best provided with reference to the accompanying drawings.

Referring to FIG. 3 the seat belt handle assembly 10 of the present invention is shown in detail. A seat belt clamp 15 is provided, comprising an upper member 16 connected at one of its ends with a lower member 17 at flexible connection 35. Openings 18 are provided in the lower member 17 at the end of lower member 17 opposite the flexible connection 35. Referring to FIGS. 5, 6 and 7, two (2) knobbed projections 19 are provided on upper member 16 extending from upper member 16 in the direction of lower member 17. Knobbed projections 19 are aligned with the openings 18 of lower member 17 and extend through the openings 18 of lower member 17 when upper member 16 is rotated toward lower member 17. The exterior circumference of the knobs of knobbed projections 19 are formed to tightly engage the openings 18 of lower member 17, thereby releasably connecting upper member 16 with lower member 17. The knobs of knoblike projections 19 extend a sufficient distance from upper member 16 to allow the seat belt to be movably contained in the space 26 provided between upper member 16 and lower member 17.

Again referring to FIG. 3, it may be seen that upper member 16 and lower member 17 of the seat belt clamp 15 are constructed with sufficient longitudinal length to contain a seat belt between knobbed projections 19 and the flexible connection 35 of upper member 16 and lower member 17.

Referring again to FIG. 3 a cylindrical orifice 20 is provided within upper member 16 which orifice 20 extending the length of the upper member 16. The cylindrical orifice 20 intersects the outer surface 28 of upper member 16 providing an elongated opening 21 along the outer surface 28 of upper member 16. The elongated opening 21 is narrower in width than the diameter of the cylindrical orifice 20. The inner surface 29 of the cylindrical orifice 20 is provided with circumferential ridges 22 at regular intervals along the length. The circumferential ridges 22 project toward the axis of the cylindrical orifice 20.

Still referring to FIG. 3 the handle 12 of the seat belt handle assembly 10 is depicted. The handle 12 comprises a rod member 23 connected to a grasp 24. The diameter of the rod 23 is slightly less than the inner diameter of the orifice 20. The rod 23 is provided with outwardly-projecting circumferential ridges 25 at regular intervals along the surface 36 of the rod 23. The rod 23 and the rod ridges 25 are constructed of respective diameters that the rod 23 may be compressed into the orifice 20 through the elongated opening 21 with the result that the outer edges of the rod ridges 25 snugly abut the inner surface 29 of the orifice 20 and the orifice ridges 22 snugly abut the surface 36 of the rod 23. The grasp 24 of the handle 12 may then be pulled away from the seat belt clamp 15 until the orifice ridges 22 abut rod ridges 25 thereby preventing further relative movement of the grasp 24 in relation the seat belt clamp 15. The rod 23 may thereby be releasably connected to seat belt clamp 15.

The rod 23 may thus be positioned within the orifice 20 with the grasp 24 at various distances from the seat belt clamp 15. Upon determining the ideal location of the grasp 24 with relation to the seat belt clamp 15, the end of the rod 23 opposite the grasp 24 may be removed by cutting or other appropriate means. The rod 23 is preferrably constructed of a flexibly rigid material such as polyethylene or high density polyurethene to allow the handle to bend for the convenience of the occupant.

Referring to FIG. 4 the seat belt handle assembly of the present invention is shown with the handle assembly 12 installed in the seat belt clamp 15 and with the knobbed projections 19 of upper member 16 engaged in the openings 18 of lower member 17. The seat belt 11 is thus slidably contained within the space 26 provided between upper member 16 and lower member 17.

FIG. 1 is a schematic view of an automobile seat and shoulder belt 11 in its retracted position. The seat and shoulder belt 11 is slidably connected to the vehicle body at upper connection 32. The seat and shoulder belt is fixedly attached to the vehicle body at another connection point (not shown) with retracting means (not shown) provided to retract the seat and shoulder belt when not in use. In its retracted condition the seat and shoulder belt is located in an approximately vertical plane at the rear of the door of the vehicle. The seat belt handle assembly 10 of the present invention is slidably attached to the retracted seat and shoulder belt 11. With the seat and shoulder belt 11 in the retracted position, the seat belt handle assembly 10 is attached to the shoulder belt between the seat belt buckle 13 and upper connection 32. The handle 12 of the seat belt handle assembly 10 projects from the seat and shoulder belt 11 toward the front of the vehicle.

FIG. 2 is a schematic view of the seat and shoulder belt 11 in relation to the vehicle seat 27 with the seat belt buckle 13 engaged with the buckle receiver 14. No occupant is depicted in the FIG. 2; however, in normal operation the occupant of the vehicle seat 27 is constrained by the seat and shoulder belt 11.

Referring again to FIGS. 1 and 2 the operation of the present seat belt handle assembly 10 may be seen. The seat belt handle assembly 10 is installed on the seat belt 11 above the seat belt buckle 13 with the grasp 24 oriented toward the front of the vehicle and is supported by the buckle. The length of the rod 23 may be determined by the user of the vehicle to meet the vehicles particular requirement for convenient access to the grasp 24 by the occupant. The vertical location of the seat belt handle assembly 10 may be determined by the occupant by adjusting the relative location of the seat belt buckle 13 on the seat and shoulder belt 11. The grasp 24 may then be conveniently reached by an occupant of the seat without having to reach behind the plane of the occupant's body. The grasp 24 is then pulled forward parallel to the direction of the occupant allowing the occupant convenient access to the buckle 13 for insertion in the buckle receiver 14. In this manner convenient access to the seat and shoulder belt 11 is provided. After the seat belt buckle is disengaged the seat belt handle assembly will be returned to its original location as the seat belt retracts and the seat belt buckle returns to its original position.

As changes may be made in the apparatus described herein without substantial departure from the scope of the invention, all matter contained in this description and illustrated in the enclosed drawings should be interpreted as illustrative only and not as limiting.

I claim:

1. In combination with a seat and shoulder belt for occupant restraint in a vehicle, a seat belt handle apparatus comprising
    clip means for attaching the handle assembly to the shoulder belt,
    a handle for grapsing the seat belt handle assembly,
    connecting means comprising a flexibly rigid material detachable attaching the handle to the clip means,
    the seat belt handle assembly being so attached to the shoulder belt that the handle projects forward parallel to the direction of the occupant when the seat belt is disengaged and the seat and shoulder belt is retracted, and wherein the distance between the said handle and the said clip means may be adjusted by varying the length of the said connecting means.

2. The apparatus according to claim 1 wherein
    the said clip mean comprises two elongate members flexibly connected at one end and releasably connected at the opposite end with the belt slidably contained between said elongate members.

3. In combination with a seat and shoulder belt for occupant restraint in a vehicle, a seat belt handle apparatus comprising
    clip means comprising two elongated members flexibly connected at one end and releasably connected at the opposite end with the shoulder belt slidably contained between said elongate members,
    a handle for grasping the said seat belt handle assembly,
    connecting means attaching the handle to the clip means,
    the said clip means being so attached to the shoulder belt that the handle projects forward parallel to the direction of the occupant when the seat belt is disengaged and the seat and shoulder belt is retracted,
    the said connecting means comprises a flexibly rigid material,
    the said connecting means is detachable connected to the said clip means,
    the distance between the said handle and the said clip means may be adjusted by varying the length of the said connecting means.

* * * * *